United States Patent
King et al.

(10) Patent No.: US 10,208,227 B2
(45) Date of Patent: Feb. 19, 2019

(54) LOW FREE MDI PREPOLYMERS FOR ROTATIONAL CASTING

(71) Applicant: Chemtura Corporation, Middlebury, CT (US)

(72) Inventors: Gerald King, Eglinton (IE); Cesare Santucci, Norma (IT); Stefania Nardin, Borgo Santa Maria (IT); Enrico Fresch, Aprilia (IT); Giulio Pietro Di Egidio, Nettuno (IT); Marco Mennechelli, Aprilia (IT); Chris Averis, Suckley (GB)

(73) Assignee: LANXESS SOLUTIONS US INC., Middlebury, CT (US)

( * ) Notice: Subject to any disclaimer, the term of this patent is extended or adjusted under 35 U.S.C. 154(b) by 232 days.

(21) Appl. No.: 14/107,044

(22) Filed: Dec. 16, 2013

(65) Prior Publication Data

US 2014/0213741 A1    Jul. 31, 2014

Related U.S. Application Data

(60) Provisional application No. 61/758,339, filed on Jan. 30, 2013.

(51) Int. Cl.

| C08G 18/32 | (2006.01) |
| C09D 175/04 | (2006.01) |
| C08G 18/48 | (2006.01) |
| C08G 18/76 | (2006.01) |
| C08K 3/34 | (2006.01) |
| C08K 3/36 | (2006.01) |
| C08G 18/10 | (2006.01) |
| B05D 1/00 | (2006.01) |
| B05D 7/26 | (2006.01) |

(52) U.S. Cl.
CPC .......... *C09D 175/04* (2013.01); *B05D 1/002* (2013.01); *B05D 7/26* (2013.01); *C08G 18/10* (2013.01); *C08G 18/3203* (2013.01); *C08G 18/4854* (2013.01); *C08G 18/7671* (2013.01); *C08K 3/346* (2013.01); *C08K 3/36* (2013.01)

(58) Field of Classification Search
None
See application file for complete search history.

(56) References Cited

U.S. PATENT DOCUMENTS

| 4,287,307 A | 9/1981 | Hostettler |
| 5,198,508 A | 3/1993 | Ueda et al. |
| 5,601,881 A | 2/1997 | Grimm et al. |
| 5,895,609 A | 4/1999 | Doyle et al. |
| 5,895,806 A * | 4/1999 | Gajewski ........................ 528/60 |
| 6,747,117 B2 | 6/2004 | Gajewski |
| 6,884,904 B2 | 4/2005 | Smith et al. |
| 2003/0065124 A1* | 4/2003 | Rosenberg et al. ............. 528/59 |
| 2003/0232954 A1* | 12/2003 | Gajewski ........................ 528/59 |
| 2004/0091617 A1 | 5/2004 | Peter et al. |
| 2005/0096403 A1 | 5/2005 | James et al. |
| 2009/0076239 A1* | 3/2009 | Xie et al. ........................ 528/60 |
| 2009/0266823 A1 | 10/2009 | Mazabraud et al. |
| 2010/0151181 A1 | 6/2010 | Locke et al. |
| 2010/0210748 A1 | 8/2010 | Leimenstoll et al. |
| 2010/0280187 A1 | 11/2010 | Goldhawk et al. |

FOREIGN PATENT DOCUMENTS

| EP | 2 395 314 A2 | 12/2011 |
| JP | 2002363239 A | 12/2002 |
| WO | WO 2011/073086 A1 | 6/2011 |

OTHER PUBLICATIONS

Ruprecht et al. "Roll Covering by Rotation Casting with Fast Reacting PUR Systems", p. 478-481, Polyurethanes World Congress 1991, Sep. 24-26, 1991.*
Bhowmick, et al. "Rubber Products Manufacturing Technology" p. 735, Feb. 15, 1994.*
Chemtura Safety Data Sheet for "Adiprene Ribbon Flow LM A1615E", Version 1, Revised Dated: May 6, 2013; Print Date: May 11, 2015, 14 pages.
Chemtura Technical Information Sheet for "Adibrene Ribbon Flow Low Monomer-3 Component Multi-Hardness"; Effectgive Date: Feb. 17, 2014, 10 pages.
Chemtura Technical Information for "Ribbon Flow: Adiprene RFA 101—3 Component Multi-Hardness System", Effective Date: Sep. 5, 2012, 6 pages.
Chemtura Material Safety Data Sheet for "Adiprene Ribbon Flow RFA-1001", Print Date: Jan. 13, 2012, 17 pages.
Chemtura Material Safety Data Sheet—Adiprene Ribbon Flow RFA-1001—Print Date: Jan. 13, 2012, 12 pages.
Chemtura Technical Information—Ribbon Flow: Adiprene RFA 1001—3 Component Multi-Hardness System—Print Date Sep. 5, 2012, 10 pages.
Japanese Office Action dated Jun. 2, 2016 from corresponding JP Application No. 2015-553875, along with unofficial English translation.

* cited by examiner

*Primary Examiner* — Christopher M Rodd
(74) *Attorney, Agent, or Firm* — Dilworth IP, LLC

(57) ABSTRACT

Rotational cast polyurethane composition prepared from a prepolymer composition comprising: a) an isocyanate-terminated polyurethane prepolymer; and b) a curative agent comprising i) a polyol; ii) an aromatic diamine; iii) a thixotropic aliphatic amine; and iv) a thixotropic colloidal additive, wherein the prepolymer comprises a product produce by the reaction of a polyol with an organic diisocyanate monomer comprising 4,4'-diisocyanato diphenylmethane (MDI), and which prepolymer comprises less than 1.0% by weight of free MDI monomer, based on the toal weight of the prepolymer, exhibits a range of enhanced physical properties compared to those obtained from prepolymers comprising a higher level of free MDI monomer.

2 Claims, No Drawings

LOW FREE MDI PREPOLYMERS FOR ROTATIONAL CASTING

This application claims benefit under 35 USC 119(e) of U.S. Provisional Application No. 61/758,339 filed Jan. 30, 2013, the disclosure of which is incorporated herein by reference.

The present invention relates generally to the preparation of polyurethane elastomer articles and coatings by rotational casting methods, and to a polyurethane prepolymer composition for use therein comprising 4,4'-diisocyanato diphenylmethane (MDI) capped polyurethane prepolymers containing reduced levels of unreacted diphenylmethane diisocyanate (MDI) monomer, i.e., less than 1.0% by weight based on the weight of the prepolymer.

BACKGROUND

Methods for coating various substrates are known, e.g., conventional casting technique, spray technique, etc. Rotational casting techniques have been employed for coating polyurethane elastomer compositions onto rigid substrates. Several advantages are associated with this method over the other known coating methods, for example, the rotational casting method requires shorter production time, there is no need for a mold to hold and composition while it cures, and loss of materials by, e.g., overspraying generally occurs is avoided.

Ruprecht et al., "Roll Covering by Rotational Casting with Fast-reacting PUR Systems", Polyurethanes World Congress 1991 (Sep. 24-26) pp. 478-481, describes rotational casting techniques useful for producing roll coverings using fast-reacting polyurethane elastomer systems. In these systems, the polyurethane reaction mixture is metered through a movable mixing head which travels at constant speed in the axial direction along the rotating roll core a short distance above its surface. The polyurethane reaction mixture solidifies very quickly (in a matter of seconds), to produce a polyurethane coating with a thickness buildup of 4 to 5 mm. Additional layers of the polyurethane reaction mixture are applied until the desired thickness of polyurethane coating is achieved.

Rotational casting reduces the number of steps involved in roll coating. However, if the polyurethane reaction mixture gels too slowly, the polyurethane coating will drip off the roll. If the polyurethane reaction mixture is formulated to gel quicker, the polyurethane can gel in the head of the mixer or ridges can develop on the outer surface of the roll requiring machine finishing of the polyurethane coating on the surface of the roll.

U.S. Pat. No. 5,895,806, incorporated herein by reference, discloses a polyurethane prepolymer composition containing dual thixotropic agents and U.S. Pat. No. 5,895,609, also incorporated herein by reference, discloses a rotational casting method for coating a cylindrical object employing the polyurethane prepolymer composition of the '806 patent. Using the composition containing dual thixotropic agents, a thicker coating was achieved per each pass without any dripping or ridging. These polyurethane coating compositions have found wide commercial use on rigid substrates, e.g., metals, plastics and composites, in areas such as, for example, paper and mill rolls, industrial rolls and graphic art printing rolls.

U.S. Pat. No. 6,747,117, incorporated herein by reference, discloses a composition useful for rotationally casting cylindrical parts comprising an isocyanate-terminated polyurethane prepolymer and a curative agent comprising a polyaspartic ester, typically as part of a co-curative system along with compounds selected from aromatic diamines and diols.

U.S. Pat. No. 5,601,881, incorporated herein by reference, discloses the use of sheet die to allow even thicker coatings to be applied. The die is disposed parallel to the axis of rotation of the body at an angle alpha, whereby the rate of reaction of the reaction mixture and the relative movement are synchronized with the circumferential speed of the rotating body in such a way that the successive convolutions overlay in the form of scales and connect together seamlessly.

However, problems are associated with the use of a sheet die. For example, a sheet die that produces a film of material with length to width ratio of 10 to 300, has difficulty maintaining even flow rate across the outlet. Differences in flow can come from edge effects, because the edges of the die have more resistance to flow, or from channeling of flow in various areas. Channeling can come from partial plugging, or viscosity increase in one area of the die, resulting in the lower viscosity, fresher material taking the path of least resistance around this area. As a result, flow becomes less even and production must eventually be stopped to clean the die. This can be a serious problem, for example, when producing large rolls where the highest quality is demanded, such as in paper mill rolls. Also, starting and stopping the roll covering operation can result in a noticeable defect in the surface of the roll at the point that production was stopped, further resulting in the roll covering being scrapped.

US Pat Pub 2004/0091617, incorporated herein by reference, discloses a rotational casting method and device for producing thicker layers, but with wider processing windows, allowing for longer runs, lower scrap rates, and higher quality articles. The method comprises: (a) rotating the substrate about an axis at a selected rotational speed, (b) applying a polymeric reaction mixture to a surface of the rotating substrate by ejecting the polymeric reaction mixture through a die at a selected flow rate, said die dividing an inlet stream of the polymeric reaction mixture into plural outlet streams, the outlet streams being applied to the substrate and the outlet streams being spaced apart from each other such that the outlet streams flow together seamlessly after application to the substrate, (c) effecting relative linear movement between the rotating substrate and the die in a direction parallel to the axis of rotation at a selected relative linear speed, and, (d) synchronizing the reaction mixture flow rate, the relative linear speed and the rotational speed in such a way that successive convolutions of the outlet streams of the polymeric reaction mixture overlap and meld together seamlessly.

Despite the many rotational casting applications currently in use, the special rheological requirements on the polyurethane reaction mixture metered onto the substrate can place some restriction on the exact resin composition of the final coating, and hence the physical properties thereof. There is therefore a need for polyurethane reaction mixtures, i.e., compositions comprising polyurethane prepolymers and curing agents, that can expand the palette of polyurethane resins available for deposition by rotational casting.

Prepolymer compositions, useful in rotational casting systems, which employ a prepolymer formed from a select polyol and an organic diisocyanate monomer such as 4,4'-diisocyanato diphenylmethane (MDI), and a curing agent formulated with thixotropic reagents to control the rhological properties of the system as it is applied are known. These MDI prepolymers contain unreacted free MDI, which is a health hazard when present in the environment at certain levels. Some commercial rotational casting grades of prepolymer contain over 10% free MDI. US Pat Pub 2009/0076239 discloses MDI prepolymers with extremely low levels of MDI, e.g., less than 1% by weight.

It has been found that compositions comprising MDI prepolymers with low free MDI content and curatives of known rotational casting formulations not only improve the industrial hygiene associated with rotational casting, but also surprisingly provide polyurethane resins and products with improved mechanical properties.

SUMMARY OF THE INVENTION

A polyurethane prepolymer composition, well suited for use in rotational casting methods, comprising:
a) an isocyanate-terminated polyurethane prepolymer;
wherein the isocyanate-terminated polyurethane prepolymer comprises the reaction product of an organic diisocyanate monomer and a polyol selected from the group consisting of ethylene glycol, diethylene glycol, dipropylene glycol, neopentyl glycol, 1,3-butanediol, 1,4-butanediol, polytetramethylene ether glycol (PTMEG), polypropylene glycol, and a dihydroxypolyester, the organic diisocyanate monomer comprises 4,4'-diisocyanato diphenylmethane (MDI), and which prepolymer comprises less than 1.0% by weight of free MDI monomer, based on the total weight of the prepolymer, and
b) a curative comprising i) a polyol; ii) an aromatic diamine; and a thixotropic agent, e.g. a thixotropic aliphatic amine and/or a thixotropic colloidal additive.

Typically the curative comprises i) a polyol; ii) an aromatic diamine; iii) a thixotropic aliphatic amine, and iv) a thixotropic colloidal additive.

In certain particular embodiments the prepolymer comprises less than 0.7%, less than 0.5% or less than 0.3% by weight of free MDI monomer, based on the toal weight of the prepolymer.

Specific diols, amines and thixotropic agents useful in the invention, as well as other common materials useful in the preparation of polyurethanes that may also be included in the above composition are known in the art.

The invention also provides a method whereby an article is formed by a process that comprises the rotational casting of the inventive composition. Essentially any rotational casting method can be used.

Also provided is the polyurethane resin composition prepared from the prepolymer composition and articles comprising the polyurethane resin.

DESCRIPTION OF THE INVENTION

One embodiment of the invention provides a polyurethane prepolymer composition comprising:
a) an isocyanate-terminated polyurethane prepolymer;
wherein the isocyanate-terminated polyurethane prepolymer comprises a reaction product of an organic diisocyanate monomer and a polyol selected from the group consisting of ethylene glycol, diethylene glycol, dipropylene glycol, neopentyl glycol, 1,3-butanediol, 1,4-butanediol, polytetramethylene ether glycol (PTMEG), polypropylene glycol, and dihydroxypolyesters, the organic diisocyanate monomer comprises 4,4'-diisocyanato diphenylmethane (MDI), and which prepolymer comprises less than 1.0%, e.g., less than 0.7%, e.g., less than 0.5%, e.g., less than 0.3%, by weight of free MDI monomer, based on the toal weight of the prepolymer, and b) a curative comprising i) a polyol; ii) an aromatic diamine; and a thixotropic agent, for example a thixotropic agent comprising a thixotropic aliphatic amine and/or a thixotropic colloidal additive, often the thixotropic agent comprises a thixotropic aliphatic amine and a thixotropic colloidal additive.

It is anticipated of course that even if one were to introduce free MDI to the polyurethane prepolymer composition in a manner that is unrelated to the preparation of prepolymer component a), the amount of free MDI in the overall composition would still be limited relative to the amount of prepolymer present, e.g., the amount of free MDI present in the overall composition does not exceed 1%, 0.7%, 0.5% or 3% by weight based on the total amount of prepolymer present in the composition.

One embodiment of the invention comprises a)the prepolymer above and b)a curative comprising i) a polyol; ii) an aromatic diamine; iii) a thixotropic aliphatic amine; and iv) a thixotropic colloidal additive.

In other embodiments the curative may comprise a polyaspartic ester, often as part of a mixture comprising e.g., a co-curative selected from the group consisting aromatic diamines and diols and optionally thixotropic agents.

For the purposes of this invention, a material is "thixotropic" if its addition to the polyurethane composition results in a composition whose viscosity lowers under shear and whose viscosity rises (thickens) in the absence of shear.

Polyols useful in the preparation of the isocyanate-terminated polyurethane prepolymer can include high MW polyols, for example, having a number average molecular weight of at least about 250 and can be as high as , e.g., about 10,000, often from about 650 to 3000, and low MW polyols, e.g., 250 or less. Combinations of high MW and low MW polyols may be used.

For example, high MW polyols include polyalkylene ether polyols having the general formula $HO(RO)_nH$, wherein R is an alkylene radical and n is an integer large enough that the polyether polyol has a number average molecular weight of at least 250. Such polyalkylene ether polyols are well-known and can be prepared by the polymerization of cyclic ethers such as alkylene oxides and glycols, dihydroxyethers, and the like, using methods known in the art.

High MW polyol also may include polyester polyols, which can be prepared by reacting dibasic acids, e.g., adipic acid, sebacic, phthalic acid and the like, with diols such as ethylene glycol, 1,2-propylene glycol, 1,4-butylene glycol and diethylene glycol, tetramethylene ether glycol, and the like. Some polyester polyols also employ caprolactone and dimerized unsaturated fatty acids in their manufacture, e.g., a polyester polyol obtained by the addition polymerization of e-caprolactone in the presence of an initiator.

Low MW polyols, i.e., polyols with an average molecular weight of less than 250, include aliphatic glycols such as ethylene glycol, diethylene glycol, dipropylene glycol, neopentyl glycol, 1,3-butanediol, 1,4-butanediol, and the like. Low MW polyols are most typically used as the minor part of a High MW/Low MW polyol mixture.

For example, polyols useful in the preparation of the isocyanate-terminated polyurethane prepolymer of this invention include polytetramethylene ether glycols (PTMEG), polypropylene glycols, and dihydroxypolyesters.

In a particular embodiment the isocyanate-terminated polyurethane prepolymer a) comprises a polytetramethylene ether glycol (PTMEG).

In certain embodiments the curative b) comprises a polyol selected from the group consisting of ethylene glycol, diethylene glycol, dipropylene glycol, neopentyl glycol, 1,3-butanediol, PTMEG, polypropylene glycol, and a dihydroxypolyester.

In certain embodiments the curative b) comprises an aromatic amine selected from the group consisting of 4,4'-methylene-bis-(3-chloro)aniline (MBCA), 4,4'methylene-bis-(3-chloro-2,6-diethyl)aniline (MCDEA), diethyl toluene diamine (DETDA), tertiary butyl toluene diamine (TBTDA), dimethylthio-toluene diamine, trimethylene glycol di-p-aminobenzoate, 1,2-bis(2-aminophenylthio)ethane, 4,4'-methylene bis(2-chloroaniline), 2,2'5-trichloro-4,4'-methylene-diamine, naphthalene-1,5-diamine, ortho-phenylene diamine, meta-phenylene diamine, para-phenylene diamine, toluene-2,4-diamine, dichlorobenzidine, diphenylether-4,4'-diamine, and mixtures thereof.

In certain embodiments the curative b) comprises a thixotropic aliphatic amine selected from the group consisting of ethylene diamine, 1,6-hexanediamine, 1,12-dodecane diamine, 1,4-cyclohexane diamine, isophorone diamine, diethylene triamine, triethylene tetramine, amine-terminated polyoxypropylenes, xylene diamine, and piperazine.

In certain specific embodiments the curative b) comprises a thixotropic colloidal additive selected from the group consisting of fumed silica, clay, bentonite, and talc.

One specific embodiment of the invention provides a polyurethane prepolymer composition comprising:
a) an isocyanate-terminated polyurethane prepolymer prepared by reacting an organic diisocyanate monomer with a polyol, which prepolymer comprises a reaction product of PTMEG and MDI, and which prepolymer comprises less than 1.0%, e.g., less than 0.7%, e.g., less than 0.5%, e.g., less than 0.3%, by weight of free MDI monomer, based on the toal weight of the prepolymer; and
b) a curative comprising, based on the total weight of the curative agent:
  i) about 10 wt % to about 90 wt % of a polyol selected from the group consisting of ethylene glycol, diethylene glycol, dipropylene glycol, neopentyl glycol, 1,3-butanediol, PTMEG, polypropylene glycol, and a dihydroxypolyester;
  ii) about 10 wt % to about 90 wt % of an aromatic diamine selected from the group consisting of 4,4'-methylene-bis-(3-chloro)aniline (MBCA), 4,4'methylene-bis-(3-chloro-2,6-diethyl)aniline (MCDEA), diethyl toluene diamine (DETDA), tertiary butyl toluene diamine (TBTDA), dimethylthio-toluene diamine, trimethylene glycol di-p-aminobenzoate, 1,2-bis(2-aminophenylthio)ethane, 4,4'-methylene bis(2-chloroaniline), 2,2'5-trichloro-4,4'-methylene-diamine, naphthalene-1,5-diamine, ortho-phenylene diamine, meta-phenylene diamine, para-phenylene diamine, toluene-2,4-diamine, dichlorobenzidine, diphenylether-4,4'-diamine, and mixtures thereof;
  iii) about 0.1 wt % to about 1.5 wt % of a thixotropic aliphatic amine selected from the group consisting of ethylene diamine, 1,6-hexanediamine, 1,12-dodecane diamine, 1,4-cyclohexane diamine, isophorone diamine, diethylene triamine, triethylene tetramine, amine-terminated polyoxypropylenes, xylene diamine, and piperazine; and
  iv) about 1.0 wt % to about 10 wt % of a thixotropic colloidal additive selected from the group consisting of fumed silica, clay, bentonite, and talc,
wherein the total active hydrogen content of the curative is equal to about 80-115% of the total isocyanate content of the isocyanate-terminated polyurethane prepolymer.

For example, the composition above wherein
a) the isocyanate-terminated polyurethane prepolymer comprises a prepolymer prepared by reacting an organic diisocyanate monomer with a polyol, in a mole ratio of organic diisocyanate monomer to polyol ranging from about 1.7:1 to about 4:1; and
b) the curative comprises
  i) about 30 to about 60 wt % of the polyol;
  ii) about 20 to about 80 wt % of the aromatic diamine;
  iii) about 0.2 to 0.7 wt % of the thixotropic aliphatic amine; and
  iv) about 2 to about 5 wt % of the thixotropic colloidal additive,
wherein the total active hydrogen content of the curative agent is equal to about 90-95% of the total isocyanate content of the isocyanate-terminated polyurethane prepolymer.

Processes for combining the components of the prepolymer composition of the invention are well known in the art and need not be discussed here.

The inventive prepolymer composition provides polyurethane resins, in particular, rotationally cast polyurethanes, with physical properties not readily obtainable from other similar prepolymer compositions. For example, the majority of rotational cast polyurethane systems available on the commercial market can produce hardness ranges between 70 and 95 Shore A. In order to produce a rotational cast polyurethane system with a lower hardness, a "softening additive" such as plasticizers are added.

However, the low free MDI prepolymer composition of the invention can be used to prepare a rotationally cast polyurethane layer with a hardness in the range of 40 to 70 Shore A without the use of any "softening additive". These layers are also shown to have improved tensile properties and exceptional toughness.

Various devices are known for preparing rotational cast polyurethanes, the references cited above describe a few examples of known methods and devices, e.g., U.S. Pat. No. 5,601,881 describes single polyurethane outlet systems including e.g., slit die systems, 2004/0091617 describes systems that provide dual polyurethane outlet streams, etc. The prepolymer compositions are well suited for use with any rotation casted method or device. One embodiment of the invention is to the process of preparing a rotationally cast polyurethane from the prepolymer composition of the invention. Another embodiment is to the polyurethane so produced and another embodiment is to an article comprising said polyurethane.

The compositions and methods of the invention can be used in the production of any article where rotational casting is employed, e.g., polyurethane covered rolls, wheels, etc.

EXAMPLES

Polyurethane resins prepared from conventional rotational casting prepolymer compositions and low free MDI prepolymer compositions of the invention were prepared and physical properties, tensile and abrasion loss, were tested. Polymers of different hardnesses were prepared by varying the ratio of the two curatives listed as known in the art. The curatives employed comprise PTMEG, DETDA, dimethylthio-toluene diamine, plus thixotropic additives.

Conventional System 70A-95A (Comparison Composition)

| Prepolymer: | Adiprene RFA 1001 | MDI PTMEG Prepolymer |
|---|---|---|
| Curative: | Adiprene Ribbon Flow LM B229E | |
| Curative: | Adiprene Ribbon Flow LM B136E | |

LF MDI System 70A-95A (Inventive Composition)

| Prepolymer: | Adiprene Duracast LM A615E | LF MDI PTMEG Prepolymer |
|---|---|---|
| Curative: | Adiprene Ribbon Flow LM B229E | |
| Curative: | Adiprene Ribbon Flow LM B136E | |

The tensile properties are given in the following table. The LF MDI based ribbon flow materials have higher tensile properties in comparison to the conventional RF grades at the equivalent hardness range.

| Hardness | Modulus MPa | | | | Stress at Break | Strain at Break |
|---|---|---|---|---|---|---|
| Shore A | 50% | 100% | 200% | 300% | N/mm$_2$ | % |
| 70 Comp | 1.62 | 2.42 | 3.47 | 4.98 | 6.61 | 350.75 |
| 70 INV | 1.83 | 2.70 | 4.17 | 7.74 | 21.25 | 387.68 |
| 75 Comp | 2.03 | 2.84 | 4.05 | 5.90 | 28.14 | 487.26 |
| 75 INV | 2.02 | 3.01 | 4.56 | 7.42 | 41.86 | 440.08 |
| 80 Comp | 2.69 | 3.53 | 4.94 | 7.16 | 40.63 | 513.33 |
| 80 INV | 2.62 | 3.81 | 5.91 | 10.66 | 36.16 | 394.41 |
| 85 Comp | 3.33 | 4.19 | 5.76 | 8.33 | 44.58 | 521.32 |
| 85 INV | 3.38 | 4.75 | 7.40 | 14.69 | 46.01 | 397.77 |
| 90 Comp | 4.10 | 5.30 | 8.00 | 14.10 | 46.30 | 416.70 |
| 90 INV | 6.25 | 8.55 | 16.37 | 43.45 | 45.14 | 304.70 |
| 95 Comp | 6.05 | 7.20 | 10.26 | 17.06 | 45.75 | 414.75 |
| 95 INV | 6.80 | 8.92 | 16.14 | 39.76 | 56.33 | 345.39 |

Abrasion loss was found to be improved at the lower hardnesses for the LFMDI prepolymers with little difference at the high hardness ranges.

| Hardness | DIN Abrasion Loss | |
|---|---|---|
| Shore A | Comp | INV |
| 70 | 75 | 21 |
| 75 | 45 | 26 |
| 80 | 34 | 31 |
| 85 | 37 | 40 |
| 90 | 57 | 69 |
| 95 | 52 | 68 |

What is claimed is:

1. A polyurethane prepolymer rotational casting composition comprising:
   a) an isocyanate-terminated polyurethane prepolymer prepared by reacting an organic diisocyanate monomer with a polyol, which prepolymer comprises a reaction product of polytetramethylene ether glycol and 4,4'-diisocyanato diphenylmethane, which prepolymer comprises less than 1.0% by weight of free 4,4'-diisocyanato diphenylmethane, based on the total weight of the prepolymer; and
   b) a curative comprising, based on the total weight of the curative,
      i) about 10 wt % to about 90 wt % of a polyol comprising polytetramethylene ether glycol;
      ii) about 10 wt % to about 90 wt % of an aromatic diamine comprising diethyl toluene diamine and/or dimethylthio-toluene diamine;
      iii) about 0.1 wt % to about 1.5 wt % of a thixotropic aliphatic amine selected from the group consisting of ethylene diamine, 1,6-hexanediamine, 1,12-dodecane diamine, 1,4-cyclohexane diamine, isophorone diamine, diethylene triamine, triethylene tetramine, amine-terminated polyoxypropylenes, xylene diamine, and piperazine; and
      iv) about 1.0 wt % to about 10 wt % of a thixotropic colloidal additive selected from the group consisting of fumed silica, clay, bentonite, and talc,
   wherein the total active hydrogen content of the curative agent is equal to about 80-115% of the total isocyanate content of the isocyanate-terminated polyurethane prepolymer.

2. The polyurethane prepolymer rotational casting composition according to claim 1 comprising:
   a) an isocyanate-terminated polyurethane prepolymer prepared by reacting the organic diisocyanate monomer with the polyol, in a mole ratio of organic diisocyanate monomer to polyol ranging from about 1.7:1 to about 4:1; and
   b) a curative agent comprising:
      i) about 30 to about 60 wt % of the polyol;
      ii) about 20 to about 80 wt % of the aromatic diamine;
      iii) about 0.2 to 0.7 wt % of the thixotropic aliphatic amine; and
      iv) about 2 to about 5 wt % of the thixotropic colloidal additive;
   wherein the total active hydrogen content of the curative agent is equal to about 90-95% of the total isocyanate content of the isocyanate-terminated polyurethane prepolymer.

* * * * *